No. 624,358. Patented May 2, 1899.
E. H. MAULE.
APPARATUS FOR PREVENTING CONDENSATION OF MOISTURE.
(Application filed June 28, 1898.)
(No Model.)
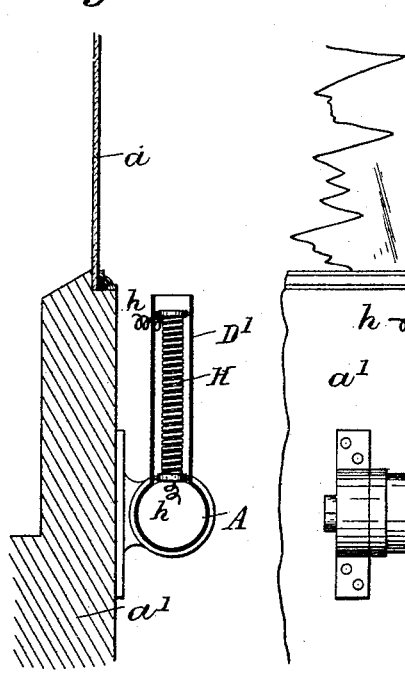
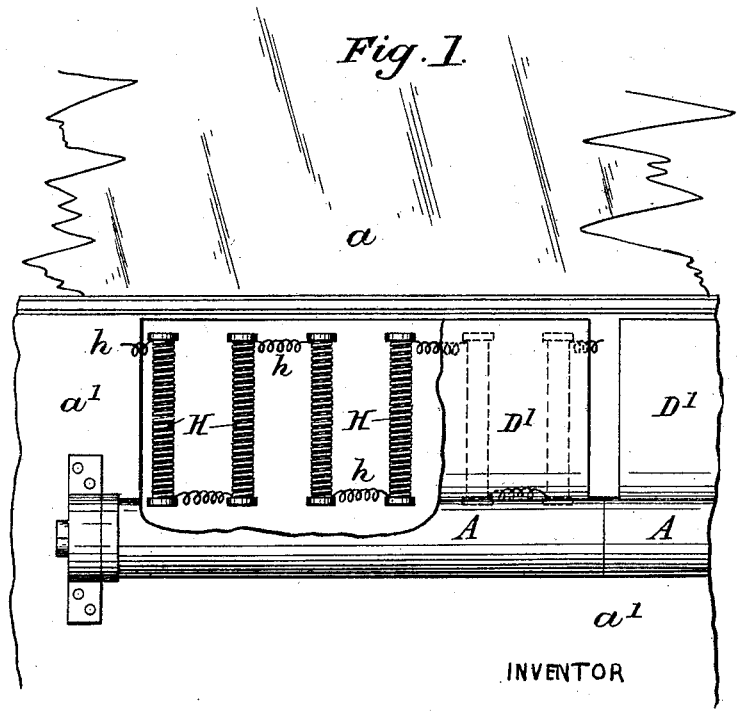
WITNESSES:
F. W. Wright.
J. C. Connor
INVENTOR
EDWARD HERBERT MAULE
BY Howson and Howson
HIS ATTORNEYS.

UNITED STATES PATENT OFFICE.

EDWARD H. MAULE, OF BIRMINGHAM, ENGLAND.

APPARATUS FOR PREVENTING CONDENSATION OF MOISTURE.

SPECIFICATION forming part of Letters Patent No. 624,358, dated May 2, 1899.

Application filed June 28, 1898. Serial No. 684,657. (No model.)

*To all whom it may concern:*

Be it known that I, EDWARD HERBERT MAULE, brewer, a subject of the Queen of Great Britain and Ireland, and a resident of 6 Princes Chambers, Corporation street, Birmingham, in the county of Warwick, England, have invented new and useful Improvements in Apparatus for Preventing Condensation of Moisture on Cold Surfaces, Especially Applicable for Removing Moisture or Dew from Windows, (for which application has been made for a patent in Great Britain, No. 29,674, dated December 15, 1897,) of which the following is a specification.

My invention relates to improved electrical means for preventing the condensation of moisture contained in the air upon cold surfaces, and is especially adapted for preventing the condensation of moisture on panes of glass, such as shop-windows, for example.

According to my invention the means employed for preventing and removing the deposits of dew are to cause a current of heated dry air to move over the surface to be protected; and the apparatus consists, essentially, of electrical apparatus for heating the air and projecting it upon the surfaces to be protected, as hereinafter described and claimed.

A supply of air is led from the outside, roughly filtered to remove dust particles and like impurities, and passed through the electrical heating apparatus, after which it is distributed over the surfaces to be protected.

Hot air lends itself to distribution over a flat plate shop-window, delivery being made out of tubes or their equivalents, standing vertically or approximately so below the window and delivering at the lower edge. The air, being hot and also having a velocity, shoots out of the pipes up the surface of the window, over which it spreads and rises by reason of its being lighter than the air of the shop.

I will describe my invention with reference to the accompanying drawings, premising that I do not limit myself to the precise details shown.

Figures 1 and 2 show, in front elevation and cross-section, respectively, one form of an electrical device for heating the air. In this arrangement the outer casing D' is open at the top, the latter being located at or near the lower edge of the window-surface, and said casing projects upwardly from and is preferably made in one with the air-main A, to which the air to be heated is admitted. In the said casing spiral coils of metal H are arranged, preferably, so as to form hollow tubes, through which a current of electricity is passed by the conductors $h$ of sufficient magnitude to heat the coils to the required temperature. By this means an induced draft of hot air is obtained for application to the window.

I claim as my invention—

A device for supplying heated air to windows consisting of an air-supply pipe arranged below the lower edge of the window-surface, a casing projecting upwardly from said pipe with its top open and located at or near the lower edge of the window-surface, a series of spiral coils of metal through which an electrical current is passed to heat the same, said coils being supported within the casing and forming tubular passages through which an induced draft of hot air is caused to pass from the air-supply pipe upwardly, whereby a current of heated air is discharged against the window-surface, substantially as described.

In testimony whereof I have signed this specification in the presence of subscribing witnesses.

E. H. MAULE.

Witnesses:
 MONTAGU GEORGE, Jr.,
 ST. JOHN MAULE,
 ARTHUR WILLIAM HANDS.